(No Model.)
P. PATTERSON.
TUBE COUPLING COVER.
No. 318,925. Patented May 26, 1885.
FIGURE 1.
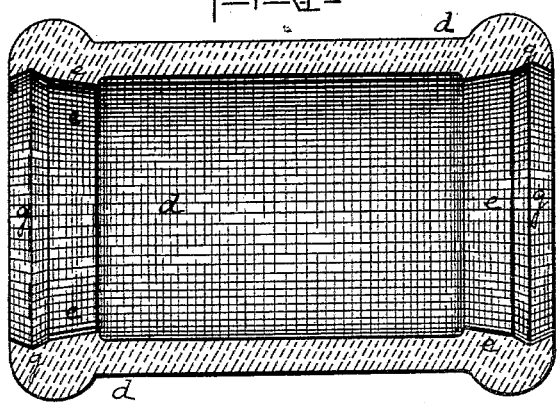
FIGURE 2.
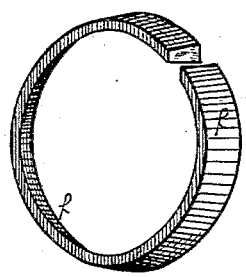
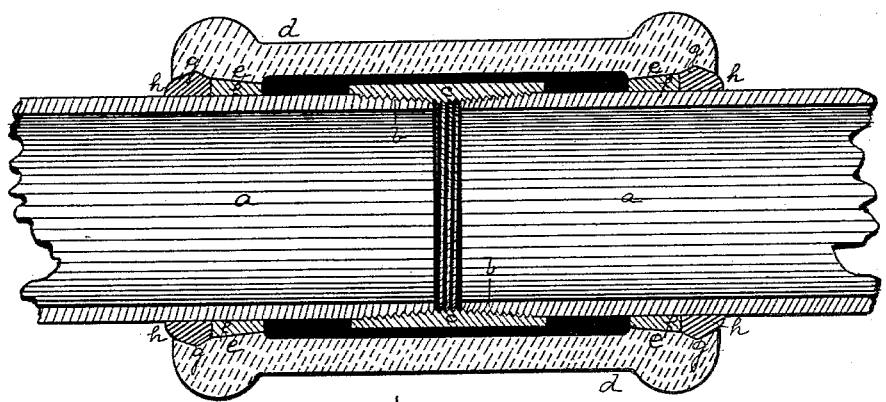
FIGURE 3.
Witnesses:
T. G. Kay
Jno Cooke
Inventor:
Peter Patterson
By James F. Kay
Attorney

UNITED STATES PATENT OFFICE.

PETER PATTERSON, OF McKEESPORT, PENNSYLVANIA, ASSIGNOR TO THE NATIONAL TUBE WORKS COMPANY, OF SAME PLACE.

TUBE-COUPLING COVER.

SPECIFICATION forming part of Letters Patent No. 318,925, dated May 26, 1885.

Application filed April 8, 1885. (No model.)

*To all whom it may concern:*

Be it known that I, PETER PATTERSON, of McKeesport, in the county of Allegheny and State of Pennsylvania, have invented a new and useful Improvement in Tube-Coupling Covers; and I do hereby declare the following to be a full, clear, and exact description thereof.

My invention relates to devices for supporting and covering the joints or couplings of pipe or tubing, its object being, first, to provide for the pipe a strong support which will relieve the screw-sockets and the threaded portion of the tubing from all lateral strain, and, second, to prevent leakage at the joints even where the ordinary screw-coupling is imperfect.

In the ordinary screw-joint generally employed with wrought-metal tubing great difficulty has been experienced on account of the weakening of the pipe by the cutting of the threads therein, the body of the pipe being no stronger for the resistance of internal strains than at the point where the thread is cut, and the pipe being very materially weakened by the cutting of the threads, so that it is exceedingly liable to break in said threads upon any severe lateral or bending strain. This has been brought especially to notice in connection with the laying of gas-lines, where the body of the pipe is often subjected to these lateral or bending strains, and especially where the line of tubing extends across the beds of rivers or creeks, as even though provision is made for the conforming of the line of tubing to the bed of the river this is difficult of accomplishment, and the current of the water against the pipe will carry it away from a straight line and throw very heavy bending strain upon the joints, and as the threaded portion is the weakest part of the pipe, and the coupling-socket acts as a fulcrum, it has been found that the pipe will give way at the joints, thus causing great trouble and expense. It has also been found that in these mains for conducting what is termed "natural gas" the gas is exceedingly subtle and rare, and the ordinary screw-coupling does not form a perfectly-tight joint therefor. By my invention the screw-threads of the pipe and socket are entirely relieved from this lateral or bending strain, and in case of leakage at the joint this leakage is prevented from escaping.

It consists, essentially, in a sleeve the inner face of which is of greater diameter than the outer face of the pipe-socket, said sleeve having at each end a wedge or tapering face, within which face a wedge or tapering ring is driven, this ring being compressed between the wedge-face of the sleeve and the body of the tubing, and so acting to clamp the sleeve upon the tubing around its entire body, so that the entire bending strain is taken by this sleeve clamped upon the tubing, and the ordinary screw-joint is entirely relieved therefrom.

It also consists in providing this sleeve beyond said wedge-faces with suitable calking-recesses, into which lead or other suitable calking material is poured after the wedge-rings are driven to place, the calking material thus serving to hold the wedge-rings in place, and also sealing the ends of the sleeve and forming a fluid-tight covering around the ordinary joint, which acts as a second or supplemental coupling.

It also consists in certain details of construction, hereinafter specifically set forth.

To enable others skilled in the art to make and use my invention, I will describe the same more fully, referring to the accompanying drawings, in which—

Figure 1 is a longitudinal section of my improved sleeve. Fig. 2 is a view of the wedge or tapering ring employed with the sleeve, and Fig. 3 is a longitudinal section of an ordinary tube-coupling having my improved invention applied thereto and fully illustrating the same.

The tubing *a* is what is termed "wrought-metal tubing," and at the end thereof a suitable threaded surface, *b*, is formed, the tube-sections being screwed into the socket *c*, thus forming the ordinary joint.

My improved sleeve *d* is formed of cast or malleable iron or steel, and, if desired, may be covered with any suitable metallic coating to preclude all leakage therefrom, so that there is no liability of leakage through the body thereof, even where there may be imperfections or defects in the casting. The sleeve is generally made much longer than the coupling-socket, for the reason that it is desired that it be wedged or clamped to the tubing some distance from the socket, and that any compression of the tubing in securing the sleeve thereto will not cause the opening of the ordinary threaded joint. The inner face of the sleeve is made of sufficient diameter to pass over the socket c, and at each end of the sleeve d is the wedge or taper face e, this face being carefully bored out to the desired taper, which will bind upon the wedge-ring sufficiently to hold it in place after it is driven to its seat. In practice these wedge-faces are generally at least four inches from the ends of the socket c when the sleeve is placed over the joint, for the reason above stated. Beyond these tapering faces e, at the ends of the sleeve, are the calking-recesses g, these calking-recesses being preferably provided with inwardly-flaring sides—that is, of larger diameter back from the mouth than at the mouth—so as to hold the calking material therein. The tapering or wedge rings f are made with any suitable metal, an iron or steel ring being suitable for the purpose, the ring being cut through at one point so as to allow of its being opened out or drawn together to accommodate itself to the body of the tubing and its seat within the sleeve. The taper of the rings f corresponds to that of the seats e, so that when seated therein the inner faces of the rings will be parallel to and have broad bearing-faces upon the body of the tubing.

When my invention is employed with the ordinary coupling, one tapering ring f and the sleeve d are slipped over the end of one pipe, and the other tapering ring f over the pipe to be connected thereto. The two pipe-sections are then united by the socket, and when a tight joint is made the sleeve is slipped over the joint, as illustrated in Fig. 3. The tapering rings f are driven by suitable tools into the seats e formed for their reception in the sleeve d, being driven to place with sufficient force to cause them to bind firmly around the body of the tubing, and so clamp the sleeve firmly thereto, thus forming, in connection with the sleeve, a strong support for the line of pipe at the joint and relieving the pipe-joint of all lateral or bending strain, so that the only strain brought upon the ordinary threaded coupling is the longitudinal strain consequent to the expansion and contraction of the pipe. As the sleeve supports the tubing some distance from the pipe-socket, as shown, it is evident that the compression of the tubing at the point where the sleeve is secured thereto will in no way act to open the threaded joint or cause leakage of gas through the same. In order to hold these taper or wedge rings in their seats, I employ the lead or other calking material, h, which is poured in the ordinary manner into the seats g, and thus acts to hold the wedges in place, the inwardly-flaring calking-recesses holding the lead against the taper rings, and so preventing their movement. This calking at the end of the sleeve will also prevent leakage of any gas or other fluid through the mouths or ends of the sleeve, so that the sleeve not only acts to brace or support the pipe at the joint and relieve the socket from any strain, but, by covering and sealing the joint, forms a second or supplemental coupling around the pipe-joint and renders the joint tight, even though the ordinary threaded joint may leak.

What I claim as my invention, and desire to secure by Letters Patent, is—

1. In combination with a tube-coupling, a sleeve extending over the same and having tapering seats at the ends thereof, and tapering rings fitting within said seats and binding the sleeve upon the tubing, substantially as and for the purposes set forth.

2. In combination with a tube-coupling, a sleeve extending over the same and having tapering seats at the ends thereof and calking-recesses beyond said seats, tapering rings fitting within said seats and binding the sleeve upon the tubing, and calking material within said recesses, substantially as and for the purposes set forth.

3. In combination with a tube-coupling, a sleeve extending over the same and having tapering seats some distance beyond the ends of the coupling-socket, and tapering rings fitting within said seats and binding the sleeve upon the tubing, substantially as and for the purposes set forth.

In testimony whereof I, the said PETER PATTERSON, have hereunto set my hand.

PETER PATTERSON.

Witnesses:
HENRY A. BOYD,
N. H. VAN FOSSEN.

Correction in Letters Patent No. 318,925.

It is hereby certified that Letters Patent No. 318,925, granted May 26, 1885, upon the application of Peter Patterson, of McKeesport, Pennsylvania, for an improvement in "Tube-Coupling Covers," should have been issued to the said Patterson and The National Tube Works Company, of same place, *assignee of one-half interest in said invention;* that the proper correction has been made in the files and records pertaining to the case in the Patent Office, and should be read in the Letters Patent to make it conform thereto.

Signed, countersigned, and sealed this 16th day of June, A. D. 1885.

[SEAL.]

H. L. MULDROW,
*Acting Secretary of the Interior.*

Countersigned:
M. V. MONTGOMERY,
*Commissioner of Patents.*